United States Patent
Tomiyama et al.

(10) Patent No.: US 9,743,470 B2
(45) Date of Patent: Aug. 22, 2017

(54) LIGHTING CONTROL CIRCUIT, ILLUMINATING LAMP USING THE LIGHTING CONTROL CIRCUIT, AND LIGHTING DEVICE USING THE ILLUMINATING LAMP

(71) Applicants: Hisashi Tomiyama, Yamato (JP); Masaharu Urano, Yokohama (JP); Kazuaki Iseda, Saga (JP); Shigemi Hagiwara, Hadano (JP)

(72) Inventors: Hisashi Tomiyama, Yamato (JP); Masaharu Urano, Yokohama (JP); Kazuaki Iseda, Saga (JP); Shigemi Hagiwara, Hadano (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/130,583

(22) Filed: Apr. 15, 2016

(65) Prior Publication Data

US 2016/0234896 A1    Aug. 11, 2016

Related U.S. Application Data

(63) Continuation of application No. 14/131,037, filed as application No. PCT/JP2012/067021 on Jun. 27, 2012, now Pat. No. 9,357,599.

(30) Foreign Application Priority Data

Jul. 6, 2011    (JP) .................................. 2011-149941

(51) Int. Cl.
*H05B 37/00*    (2006.01)
*H05B 33/08*    (2006.01)
(Continued)

(52) U.S. Cl.
CPC ........... *H05B 33/0815* (2013.01); *F21K 9/17* (2013.01); *H05B 33/0818* (2013.01);
(Continued)

(58) Field of Classification Search
CPC ............ H05B 33/0815; H05B 33/0887; H05B 33/0809; H05B 33/0848
(Continued)

(56) References Cited

U.S. PATENT DOCUMENTS

2005/0029966 A1* 2/2005 Buonocunto ........... H02J 9/065
315/291
2008/0164852 A1* 7/2008 Taniguchi ............... H02P 9/006
322/25
(Continued)

FOREIGN PATENT DOCUMENTS

EP    2 326 148 A2    5/2011
JP    11-135274    5/1999
(Continued)

OTHER PUBLICATIONS

Office Action issued on Jul. 26, 2016 in Japanese Patent Application No. 2015-210809.
(Continued)

*Primary Examiner* — Thomas Skibinski
(74) *Attorney, Agent, or Firm* — Oblon, McClelland, Maier & Neustadt, L.L.P.

(57) ABSTRACT

A lighting control circuit for an illuminating lamp includes: a rectifier part that is connected to a ballast to which commercial alternating-current electric power is supplied, and converts the alternating current to direct current; a smoothing capacitor that is provided on an output side of the rectifier part, and removes an alternating-current component included in direct current outputted from the output side; a drive circuit that has a switching element, and performs
(Continued)

on-off control on electric current flowing to a plurality of solid-state light-emitting elements connected in series to both ends of the smoothing capacitor; and an inductor that is provided in an electric power supply system between the ballast and the smoothing capacitor.

10 Claims, 5 Drawing Sheets

(51) Int. Cl.
    *F21K 99/00*     (2016.01)
    *F21Y 103/00*     (2016.01)
(52) U.S. Cl.
    CPC ....... *F21Y 2103/003* (2013.01); *Y02B 20/383* (2013.01); *Y02B 20/386* (2013.01)
(58) Field of Classification Search
    USPC ......... 315/186, 185 R, 187, 188–193, 185 S, 315/224, 291, 294, 297
    See application file for complete search history.

(56) References Cited

U.S. PATENT DOCUMENTS

| | | | |
|---|---|---|---|
| 2008/0316738 A1* | 12/2008 | Chen | F21S 8/04 362/217.05 |
| 2009/0256490 A1 | 10/2009 | Li et al. | |
| 2009/0295525 A1* | 12/2009 | Okawa | H01F 27/006 336/192 |
| 2010/0033095 A1* | 2/2010 | Sadwick | H05B 33/0809 315/51 |
| 2010/0102729 A1* | 4/2010 | Katzir | H05B 33/0803 315/113 |
| 2010/0181925 A1* | 7/2010 | Ivey | H05B 33/0815 315/224 |
| 2010/0194296 A1 | 8/2010 | Park | |
| 2010/0207536 A1* | 8/2010 | Burdalski | H05B 33/0818 315/224 |
| 2011/0043127 A1 | 2/2011 | Yamasaki | |
| 2011/0043136 A1 | 2/2011 | Radermacher | |
| 2011/0121756 A1* | 5/2011 | Thomas | H05B 33/0809 315/294 |

FOREIGN PATENT DOCUMENTS

| | | |
|---|---|---|
| JP | 2002-050938 | 2/2002 |
| JP | 2003-142290 A | 5/2003 |
| JP | 2004-192833 | 7/2004 |
| JP | 2006-211361 | 8/2006 |
| JP | 2008-277188 | 11/2008 |
| JP | 2009-105355 | 5/2009 |
| JP | 2009-245790 | 10/2009 |
| JP | 2010-157480 A | 7/2010 |
| JP | 2010-182656 | 8/2010 |
| JP | 2010-182666 | 8/2010 |
| JP | 2010-211289 | 9/2010 |
| JP | 2010-238661 | 10/2010 |
| JP | 2010-277819 A | 12/2010 |
| JP | 2011-044316 | 3/2011 |
| JP | 2011-60691 A | 3/2011 |
| JP | 2011-91018 A | 5/2011 |
| JP | 2012-195221 | 10/2012 |
| KR | 2001-0036344 A | 5/2001 |
| KR | 2003-0023372 | 3/2003 |
| KR | 10-0844538 B1 | 7/2008 |
| KR | 10-2008-0079881 A | 9/2008 |
| KR | 10-0893906 | 4/2009 |
| KR | 10-0949087 B1 | 3/2010 |
| KR | 10-2011-0062243 A | 6/2011 |
| TW | 200941004 A1 | 10/2009 |
| WO | WO 2008/136458 A1 | 11/2008 |
| WO | WO 2009/136322 A1 | 11/2009 |

OTHER PUBLICATIONS

Office Action issued on Jan. 12, 2015 in Korean Patent Application No. 10-2013-7035095 with English translation.
Korean Notice of Allowance, issued Jan. 26, 2016 in Korean Application No. 10-2013-7035095 with English-language translation. (3 pages).
Office Action issued Feb. 3, 2015 in Japanese Patent Application No. 2011-149941.
Office Action issued Jul. 24, 2015 in Korean Patent Application No. 10-2013-7035095 (with English-language translation).
Combined Office Action and Search issued Jun. 20, 2014, in Taiwanese Patent Application No. 101123924 with English translation and English translation of category of cited documents.
International Search Report Issued on Oct. 9, 2012 in PCT/JP2012/067021 Filed Jun. 27, 2012.
Japanese Office Action issued Feb. 21, 2017 in Patent Application No. 2015-210809 (without English Translation).
Office Action issued Jan. 2, 2017 in Korean Patent Application No. 10-2016-7007638 (with English language translation).

* cited by examiner

LIGHTING CONTROL CIRCUIT, ILLUMINATING LAMP USING THE LIGHTING CONTROL CIRCUIT, AND LIGHTING DEVICE USING THE ILLUMINATING LAMP

CROSS REFERENCE TO RELATED APPLICATIONS

This application is a continuation of U.S. application Ser. No. 14/131,037, filed Jan. 6, 2014, which is a National Stage of PCT/JP2012/067021, filed Jun. 27, 2012, which claims the benefit of priority from Japanese Patent Application No. 2011-149941, filed Jul. 6, 2011, and the contents of each is hereby incorporated by reference in its entirety.

TECHNICAL FIELD

The present invention relates to a lighting control circuit used for performing lightning control on a solid-state light-emitting element, an illuminating lamp using the lighting control circuit, and a lighting device having the illuminating lamp.

BACKGROUND ART

Conventionally, in place of a fluorescent lamp having a filament electrode, an illuminating lamp using a low-power-consumption solid-state light-emitting element, for example, a light-emitting diode (LED), has been proposed (See Japanese Patent Application Publication number 2008-277188).

According to the disclosure in Japanese Patent Application Publication number 2008-277188, it is possible to not only install an illuminating lamp having a solid-state light-emitting element in a lighting device using a glow-starter-type fluorescent lamp, or a lighting device using a rapid-start fluorescent lamp, but also interchangeably install the illuminating lamp having the solid-state light-emitting element in a lighting device having an inverter-type ballast for a fluorescent lamp.

SUMMARY OF THE INVENTION

A lighting device for a fluorescent lamp having an inverter-type ballast has features such as electric power saving, high efficiency, usability of both 50 Hz and 60 Hz frequencies, low noise, no flickering, and so on. However, in a case of installing an illuminating lamp having a solid-state light-emitting element in the lighting device having the inverter-type ballast for the fluorescent lamp, impedance of the illuminating lamp having the solid-state light-emitting element seen by the ballast is low, the ballast does not operate normally due to an overcurrent protection operation, and therefore there is a possibility that the illuminating lamp having the solid-state light-emitting element is not lit.

Generally, it is known that in an existing ballast for an inverter-type fluorescent lamp, when an electric current flowing to a ballast for a fluorescent lamp is less than or equal to 100 mA, an overvoltage protection circuit operates, and when the electric current flowing to the ballast for the fluorescent lamp is equal to or more than 500 mA, an overcurrent protection circuit operates.

According to the disclosure in Japanese Patent Application Publication number 2008-277188, impedance of the illuminating lamp having the solid-state light-emitting element seen by the ballast is set to high by using direct-current resistor and a capacitor that have impedance approximating an existing filament of a fluorescent lamp; however, in a case of installing the illuminating lamp having the solid-state light-emitting element in place of a lighting device for the existing fluorescent lamp, there still are problems to be solved such as a reduction of high frequency noise, suppression of inrush current, and so on.

An object of the present invention is to provide a suitable lighting control circuit used for performing lighting control when, in an existing lighting device for a fluorescent lamp, an illuminating lamp having a solid-state light-emitting element is installed in place of the fluorescent lamp, an illuminating lamp using the lighting control circuit, and a lighting device having the illuminating lamp.

In order to achieve the object, an embodiment of the present invention provides: a lighting control circuit for an illuminating lamp comprising: a rectifier part that is connected to a ballast to which commercial alternating-current electric power is supplied, and converts the alternating current to direct current; a smoothing capacitor that is provided on an output side of the rectifier part, and removes an alternating-current component included in direct current outputted from the output side; a drive circuit that has a switching element, and performs on-off control on electric current flowing to a plurality of solid-state light-emitting elements connected in series to both ends of the smoothing capacitor; and an inductor that is provided in an electric power supply system between the ballast and the smoothing capacitor.

In order to achieve the object, an embodiment of the present invention provides: a straight tube illuminating lamp, in a straight tube each one of both ends of which is sealed by a base having a pair of electrode pins, comprising: a lighting control circuit, the lighting control circuit including: a rectifier part that is connected to a ballast to which commercial alternating-current electric power is supplied, and converts the alternating current to direct current; a smoothing capacitor that is provided on an output side of the rectifier part, and removes an alternating-current component included in direct current outputted from the output side; a plurality of solid-state light-emitting elements that is connected in series to both ends of the smoothing capacitor; a drive circuit in which a switching element is provided, and that performs on-off control on electric current flowing to the plurality of solid-state light-emitting elements; and an inductor that is provided in an electric power supply system between the ballast and the smoothing capacitor, and increases impedance of the smoothing capacitor seen by the ballast.

DESCRIPTION OF THE PREFERRED EMBODIMENTS

Hereinafter, with reference to the drawings, a lighting control circuit according to an embodiment of the present invention, an illuminating lump using the lighting control circuit, and a lighting device using the illuminating lamp will be explained.

Figure 1:
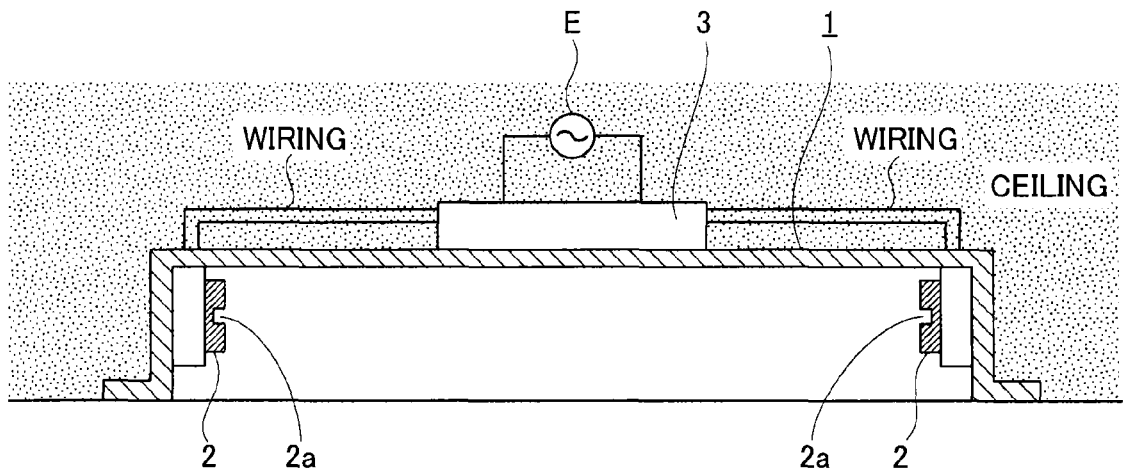
FIG. 1 is a cross-sectional view illustrating an outline of a lighting device having an existing ballast for an inverter-type fluorescent lamp in which an illuminating lamp having a solid-state light-emitting element is installable according to an embodiment of the present invention.
Figure 2:
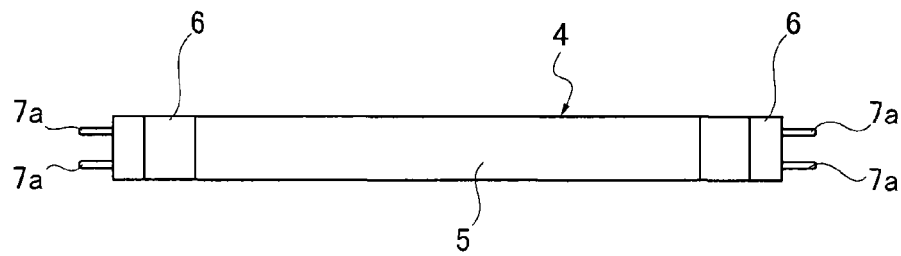
FIG. 2 is a front view illustrating an outline of an exterior view of an illuminating lamp that is installable in the lighting device illustrated in FIG. 1.

In FIG. 1, reference number 1 denotes a reflecting umbrella in which a straight tube illuminating lamp is installed. In the reflecting umbrella 1, at both ends in the direction where they extend, a pair of sockets 2 is provided at intervals. In the reflecting umbrella 1, an existing ballast for a fluorescent lamp to which electric power is supplied from a commercial alternating-current power source E is provided.

Figure 4:
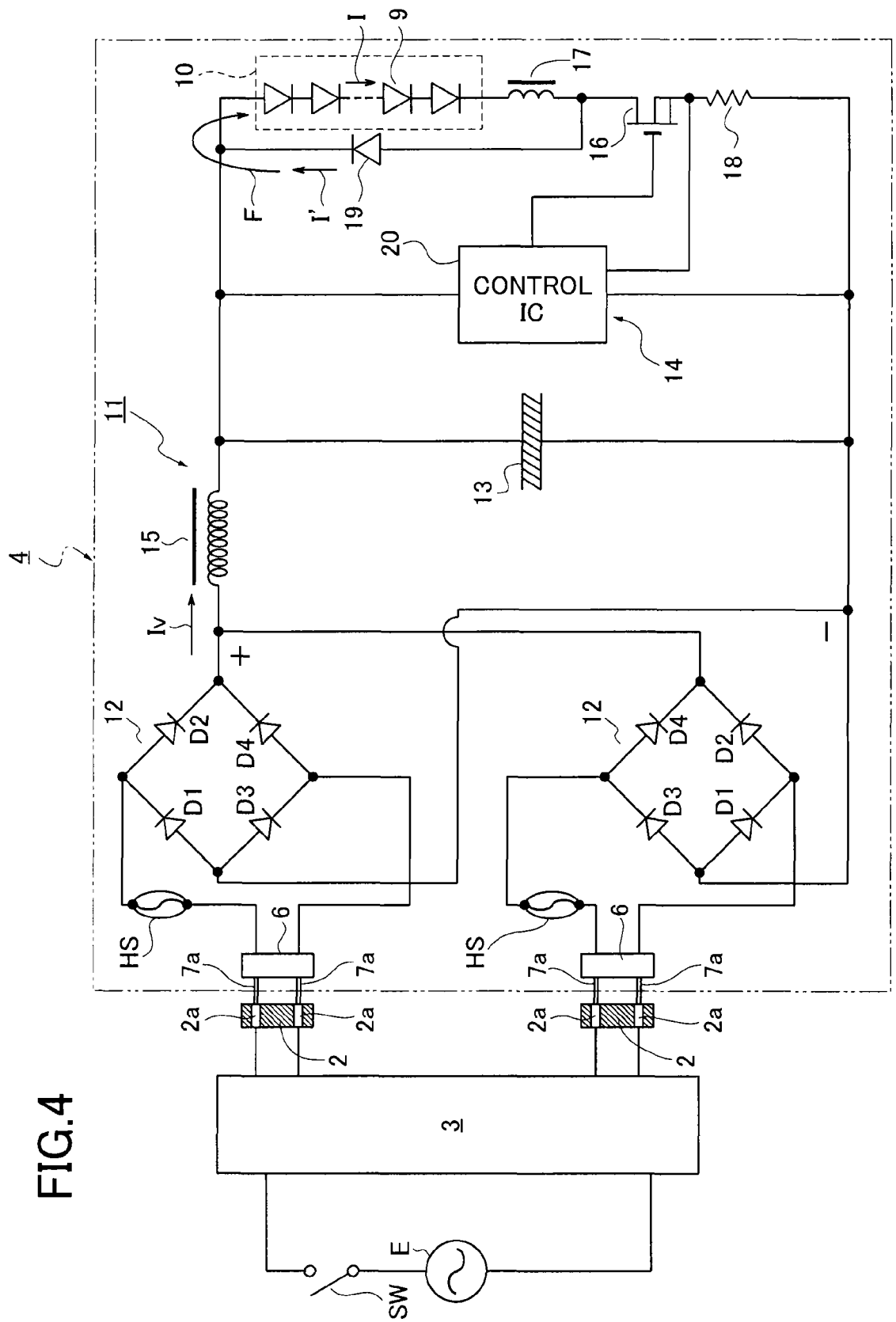
FIG. 4 is a connection diagram illustrating an example of a lighting control circuit of an illuminating lamp having a solid-state light-emitting element according to an embodiment of the present invention.

In the lighting device, an existing straight tube fluorescent lamp is installable; however, here, in place of the existing straight tube fluorescent lamp, a straight tube illuminating lamp 4 illustrated in FIG. 4 is installed. Each of both end parts of a straight tube 5 of the illuminating lamp 4 is sealed with a base 6. In the base 6, a pair of electrode pins 7a, 7a that constitutes a part of an electric power supply system is provided.

Figure 3:
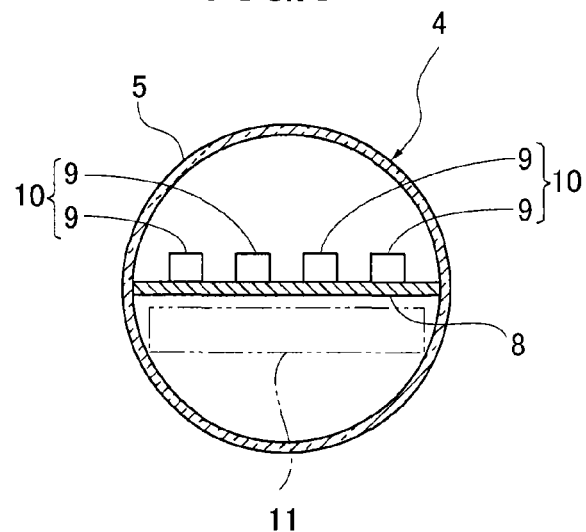
FIG. 3 is a view illustrating an outline of an enlarged cross-section of the illuminating lamp illustrated in FIG. 2.

In the straight tube 5, as illustrated in FIG. 3, a circuit board 8 that extends in a longitudinal direction of the straight tube 5 is provided. On one surface side of the circuit board 8, a series luminous body 10 where a plurality of solid-state light-emitting elements 9 is connected in series is provided. On the other side of the circuit board 8, a lighting control circuit 11 is provided.

The commercial alternating-current power source E is connected to the ballast 3. A frequency of the commercial alternating-current power source E is 50 Hz/60 Hz, for example. An output side of the ballast 3 is connected to the pair of sockets 2. Each one of the pair of the sockets 2 has a pair of electrode terminals 2a, 2a. The pair of electrode pins 7a, 7a is connected to the pair of electrode terminals 2a, 2a.

Figure 5:
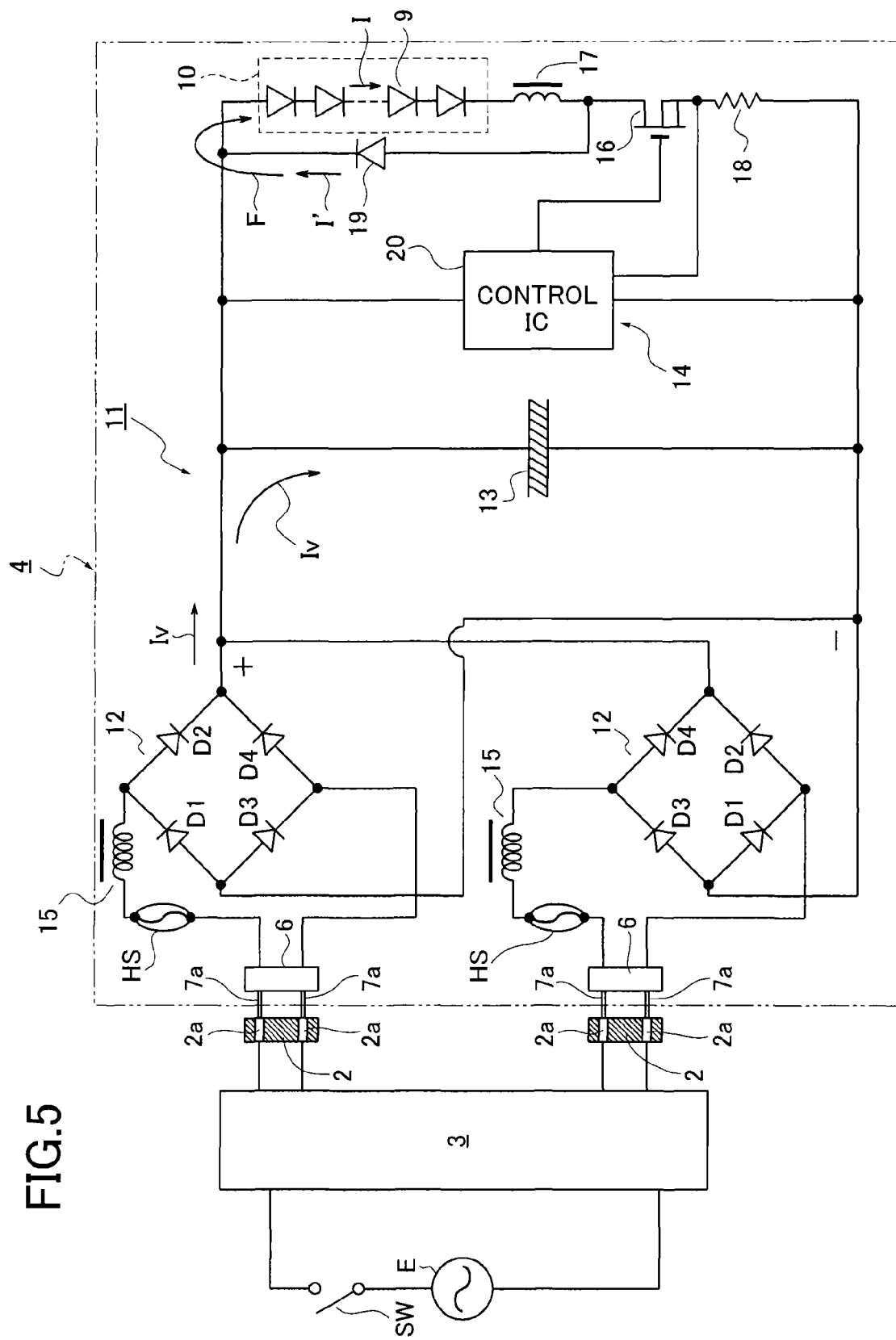
FIG. 5 is a connection diagram illustrating another example of a lighting control circuit of an illuminating lamp having a solid-state light-emitting element according to an embodiment of the present invention.
Figure 6:
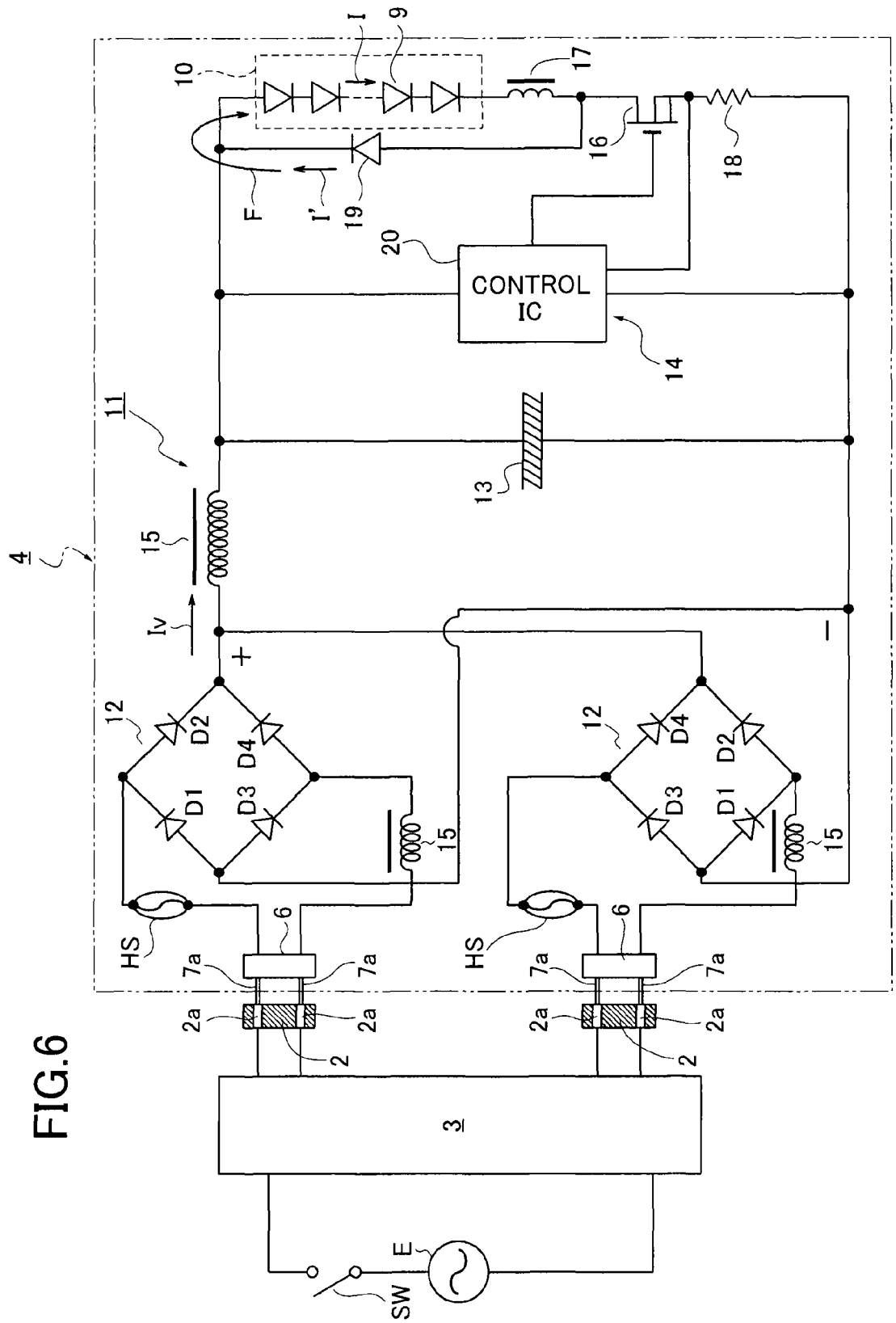
FIG. 6 is a connection diagram illustrating still another example of a lighting control circuit of an illuminating lamp having a solid-state light-emitting element according to an embodiment of the present invention.

The lighting control circuit 11, as illustrated in FIGS. 4 to 6, includes a pair of rectifier parts 12, a smoothing capacitor 13, a constant current control circuit 14 as a drive circuit, and an inductor 15. The rectifier parts 12 are connected to the ballast 3 to which the electric power is supplied from the commercial alternating-current power source E, and convert alternating current to direct current.

Preferably, a bridge-type full-wave rectifier circuit having constant voltage diodes D1 to D4 constitutes the rectifier parts 12. An input side of each one of the rectifier parts 12 is connected to the pair of electrode pins 7a, 7a via a fuse HS. An output side of each one of the rectifier parts 12 is connected to each electrode at both sides of the smoothing capacitor 13.

The smoothing capacitor 13 removes an alternating-current component included in direct current Iv outputted from the output side. Here, an electric field capacitor is used as the smoothing capacitor 13. To the electrodes at both sides of the smoothing capacitor 13, both ends of the series luminous body 10 are connected. As the solid-state light-emitting element 9 constituting the series luminous body 10, for example, a light-emitting diode (LED) is used. Further, a plurality of series luminous bodies 10 may be connected in parallel.

A constant current control circuit 14 generally includes a switching element 16, a DC (direct current) cut choke coil 17, a current-detecting resistor 18, a feedback zener diode 19, and a control IC 20. For example, a MOSFET (Metal-Oxide-Semiconductor Field-Effect Transistor) constitutes the switching element 16.

A drain of the switching element 16 is connected to a cathode of the solid-state light-emitting element 9 via the DC cut choke coil 17. A source of the switching element 16 is connected to a negative side of the electric power supply system via the current-detecting resistor 18.

The control IC 20 detects electric current I flowing to the series luminous body 10 by the current-detecting resistor 18, and performs on-off control on the switching element 16 such that the electric current I flowing to the series luminous body 10 is constant. On-off frequencies of the control IC 20 are set to a range from 20 kHz to 70 kHz (except for a frequency range from 33 kHz to 41 kHz of a household remote controller).

A case where the switching element 16 is in an always-on state is also included occasionally.

The DC cut choke coil 17 and the feedback zener diode 19 have a function of passing direct current I' in the direction of an arrow F by an induced electromotive force that is generated when the switching element 16 is switched from on to off.

Preferably the inductor 15 is provided in the electric power supply system between the ballast 3 and the smoothing capacitor 13.

By providing the inductor 15 in the electric power supply system between the between the ballast 3 and the smoothing capacitor 13, it is possible to increase the impedance of the smoothing capacitor 13 seen by the ballast 3. Thus, it is possible to reduce a peak value of inrush current Iv' (see FIG. 7) flowing to the smoothing capacitor 13. The inductor 15 increases the impedance of the smoothing capacitor 13 seen by the ballast 3.

That is, since it is possible to reduce the effective current, it is possible to prevent the overcurrent protection of the ballast 3 from operating. And even in a case where the illuminating lamp 4 having a solid-state light-emitting element is installed in an existing lighting device for a fluorescent lamp, it is possible to operate normally.

Preferably, as the inductor 15, a high-frequency coil is used. Preferably, inductance of the high-frequency coil is between 100 µH and 1 mH.

In an embodiment illustrated in FIG. 4, one high-frequency coil is provided between the smoothing capacitor 13 and the output side of the rectifier part 12. In this embodiment, the high-frequency coil is provided on a positive side of the electric power supply system; however, it may be provided on a negative side of the electric power supply system.

In addition, as illustrated in FIG. 5, a pair of high-frequency coils may be provided in the electric power supply system between the ballast 3 and an input side of the rectifier part 12.

Furthermore, as illustrated in FIG. 6, one high-frequency coil may be provided in the electric power supply system between the smoothing capacitor 13 and the output side of the rectifier part 12, and a pair of high-frequency coils may be provided in the electric power supply system between the smoothing capacitor 13 and the input side of the rectifier part 12.

As illustrated in FIGS. 5 and 6, it is necessary to provide a pair of high-frequency coils between the ballast 3 and the input side of the rectifier part 12. However, it is possible to use small high-frequency coils, and therefore, it is possible to miniaturize an illuminating lamp.

Figure 7:
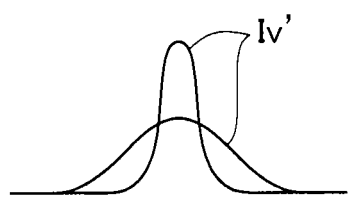
FIG. 7 is a diagram illustrating an example of a waveform of inrush current.

At the moment of turning a power switch SW on, a commercial alternating current is supplied to the electrode pins 7a, 7a of the illuminating lamp 4 via the ballast 3, the commercial alternating current is converted to direct current Iv by the rectifier part 12, and then the direct current Iv flows to the smoothing capacitor 13 as inrush current Iv'. However, according to the embodiment of the present invention, in the lighting control circuit, since the inductor 15 is provided in the electric power supply system of the illuminating lamp 4, and the inductor 15 acts as a resistance component, a peak value of the inrush current Iv' is reduced as illustrated in FIG. 7.

Accordingly, it is possible to prevent the overcurrent from flowing to the ballast 3. Therefore, effective current is reduced, and it is possible to prevent the overcurrent protection of the ballast 3 from operating. As a result, it is possible to operate an illuminating lamp 4 having a solid-state light-emitting element 6 normally, even in a case where the illuminating lamp is installed in an existing lighting device for a fluorescent lamp.

Figure 8:
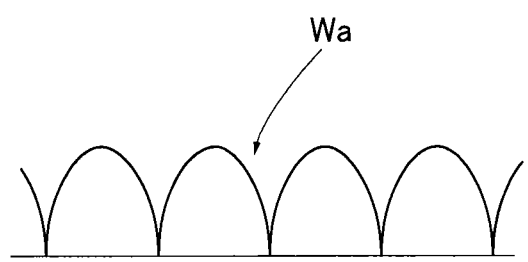
FIG. 8 is a diagram illustrating an example of a full-wave rectification waveform.

Next, according to the light control circuit, as illustrated in FIG. 8, full-wave rectification is performed on alternating current by the rectifier part 12, and the alternating current is converted to half-sine waveform current Wa. The half-sine waveform current Wa is converted to direct current I by the smoothing capacitor 13.

Figure 9:
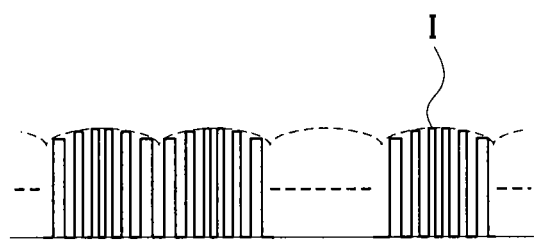
FIG. 9 is a diagram illustrating an example of smoothed current.

As illustrated in FIG. 9, the control IC 20 performs the on-off control on the switching element 16 so that the direct current I is sampled in a PWM (Pulse Width Modulation), and the direct current I flowing to the solid-state light-emitting element 9 is controlled to be a constant current.

Occasionally, also in a case where the switching element 16 is in the always-on state, the direct current I flows.

In this embodiment, the inductor 15 is provided in the lighting control circuit mounted in the illuminating lamp 4, and therefore, it is possible to prevent external noise due to a lightning surge of a lightning strike, or the like from mixing, and it is possible to reduce flickers of the illuminating lamp 4 caused by the external noise.

Further, there is also an effect such that leakage of high-frequency noise occurring in the illuminating lamp 4 is suppressed.

In particular, compared to a case where the impedance of an illuminating lamp having a solid-state light-emitting element seen by a ballast is set to high by use of direct-current resistor and a capacitor that have an impedance approximating an existing filament of a fluorescent lamp, it is advantageous in that power consumption is small.

Furthermore, it is possible to reduce inrush current Iv', and therefore it is possible to prevent a blowout of a fuse, and a trip of a breaker.

In addition, according to the embodiment of the present invention, the inductor 15 still acts as an alternating-current impedance, and therefore, it is possible to install the illuminating lamp 4 in not only a lighting device including an existing ballast for an inverter-type fluorescent lamp, but also lighting devices including an existing ballast for a glow-starter-type fluorescent lamp and an existing ballast for a rapid-start fluorescent lamp.

According to the embodiment of the present invention, without changing a ballast for an existing fluorescent lamp, in place of the fluorescent lamp, even in a case where an illuminating lamp having a solid-state light-emitting element is installed in an existing lighting device, it is possible to perform lighting control on the illuminating lamp without any trouble.

In addition, it is possible to reduce high-frequency noise, suppress inrush current, and prevent external noise from mixing.

In particular, compared to a case where the impedance of an illuminating lamp having a solid-state light-emitting element seen by a ballast is set to high by use of direct-current resistor and a capacitor that have an impedance approximating a filament of the existing fluorescent lamp 4, it is advantageous in that power consumption is small Although the present invention has been described in terms of exemplary embodiments, it is not limited thereto. It should be appreciated that variations may be made in the embodiments described by persons skilled in the art without departing from the scope of the present invention as defined by the following claims.

CROSS-REFERENCE TO RELATED APPLICATIONS

The present application is based on and claims priority from Japanese Patent Application number 2011-149941, filed Jul. 6, 2011, the disclosure of which is hereby incorporated by reference herein its entirety.

The invention claimed is:

1. A lighting control circuit for controlling a solid-state light-emitting element, comprising:
a rectifier part that is connected to a ballast to which commercial alternating-current electric power is supplied, and converts the alternating current to direct current, the rectifier part constituting a bridge-type full-wave rectifier circuit;
a smoothing capacitor that is provided on an output side of the rectifier part, and removes an alternating-current component included in direct current outputted from the output side;
a high-frequency coil that is used as an inductor, the high-frequency coil being provided between the smoothing capacitor and an output side of the rectifier part, increasing impedance of the smoothing capacitor seen by the ballast, and suppressing high-frequency noise occurring on a side of the smoothing capacitor; and
a constant current control circuit that performs constant current control on the solid-state light-emitting element.

2. The lighting control circuit according to claim 1, wherein the high-frequency coil is provided between the ballast and an input side of the rectifier part.

3. The lighting control circuit according to claim 1, wherein the high-frequency coil is provided between the smoothing capacitor and the output side of the rectifier part, and a pair of high-frequency coils are provided between the ballast and an input side of the rectifier part.

4. The lighting control circuit according to claim 1, wherein inductance of the high-frequency coil is between 100 μH and 1 mH.

5. The lighting control circuit according to claim 1, wherein a plurality of solid-state light-emitting elements are connected in series to form series luminous bodies connected in parallel.

6. The lighting control circuit according to claim 5, wherein the constant current control circuit includes
   a switching element, and
   a control IC that detects electric current flowing to the series luminous body and that performs on-off control on the switching element such that the electric current flowing to the series luminous body is constant.

7. The lighting control circuit according to claim 1, wherein the inductor is configured to prevent external noise.

8. A straight tube illuminating lamp in a straight tube, each one of both ends of which is sealed by a base having a pair of electrode pins, comprising:
   a plurality of solid-state light emitting elements; and
   the lighting control circuit according to claim 1.

9. The straight tube illuminating lamp according to claim 8, further comprising:
   a circuit board that extends in a longitudinal direction of the straight tube in the straight tube, wherein
   the plurality of solid-state light-emitting elements are provided on one surface side of the circuit board, and
   the lighting control circuit is provided on the other side of the circuit board.

10. A lighting device, comprising:
    a reflecting umbrella used for a straight tube fluorescent lamp;
    a pair of sockets that is provided at both ends of the reflecting umbrella at intervals;
    a ballast for a fluorescent lamp to which commercial alternating-current electric power is supplied; and
    the straight tube illuminating lamp according to claim 8, wherein
    the pair of electrode pins of the illuminating lamp is connected to the pair of sockets respectively.

* * * * *